Patented Aug. 19, 1947

2,426,128

UNITED STATES PATENT OFFICE 2,426,128

PLASTIC COMPOSITIONS MADE WITH TRIMETHYLOLNITROMETHANE

William W. Trowell, Greenville, S. C., assignor to Hercules Powder Company, Wilmington, Del., a corporation of Delaware No Drawing. Application December 18, 1940, Serial No. 370,623

12 Claims. (Cl. 154—136)

This invention relates to plastic and coating materials or compositions of matter, embodying an organic material which is capable of being hardened by formaldehyde.

Heretofore, various resinous and protein binding materials, synthetic compositions, etc., such as phenolic resins, urea resins, casein, blood albumen, etc., have been hardened by formaldehyde, or by hexamethylenetetramine. Various types of converting agents have been proposed and utilized to provide products with improved properties such as higher strength, greater hardness, superior resistance to solvents, and increased temperature resistance. Ordinary catalysts such as ammonia or paraphenylenediamine are troublesome because they slowly act upon the resin before use and considerably shorten its useful life. Hexamethylenetetramine which is the most useful converting agent for thermosetting resins, causes trouble by reacting with the resin prematurely, particularly in the case of resins in solution, and in addition by releasing ammonia and amines in the form of gases during the pressing or molding operation. These gases become entrapped in the finished article causing loss of strength and inferior quality. Moreover, hexamethylenetetramine possesses a very limited solubility in the solvents ordinarily employed. The hardening of protein plastics and compositions has commonly been effected by immersion or by external application. The difficulty of applying formaldehyde in this manner has been a source of considerable trouble in the protein plastic industry. For example, incomplete and uneven hardening, non-uniform properties of the product, brittleness of the product, etc., are commonly encountered.

It is an object of the present invention to devise an improved process for the hardening of organic materials. Another object is to provide improved compositions of matter containing the material to be hardened and a hardening agent distributed therethrough which automatically, upon subjecting the material to heat, effects hardening and plasticization of the shaped article. Another object is to provide an improved process of forming resinous binding materials from phenols and ureas. Still other objects will more fully hereinafter appear.

These objects are accomplished in accordance with the present invention by the use of trimethylolnitromethane (also known as 2-(hydroxymethyl)-2-nitro-1,3-propanediol, as nitroisobutane-triol and inaccurately as nitroisobutyl glycerol) or of dimethylolnitroethane (also known as 2-methyl-2-nitro-1,3-propanediol, and inaccurately as nitroisobutyl glycol) in place of formaldehyde or hexamethylenetetramine. These compounds have the following structural formulas:

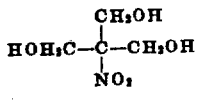 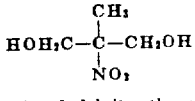

Trimethylolnitromethane    Dimethylolnitroethane

These compounds may be said to have the general formula:

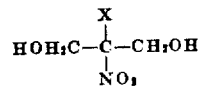

where X is methyl or hydroxymethyl. Likewise these compounds may be designated by the expression 2-X-2-nitro-1,3-propanediol where X is selected from the group consisting of methyl and hydroxymethyl. Of these two compounds, I prefer to use trimethylolnitromethane.

Under the influence of heat, trimethylolnitromethane breaks down to form formaldehyde and tar, the decomposition taking place at a moderate rate which prevents the release of larger amounts of formaldehyde than will immediately react with the resin or other formaldehyde-reactive material at hand. Resins are commonly made with less than the optimum amount of formaldehyde in order to render them easy to handle because of less critical end points and in order to lower costs. By means of the present invention resins can be made with still less formaldehyde than before, thereby making them still less critical and also more useful because of their lower viscosities. The formaldehyde content of the molded article can then be raised to normal by the incorporation of trimethylolnitromethane. The tar formed by the thermal decomposition of the trimethylolnitromethane also functions as a plasticizer for the plastic and increases the impact resistance of the finished article. Another advantage of trimethylolnitromethane is its good solubility in laminating varnish or other heat convertible resinous coating compositions, and its compatibility with the synthetic resins used in such compositions. This permits the use of larger amounts of converting agent than have been heretofore employed and it also allows a better distribution of the converting agent. Furthermore, decomposition of trimethylolnitromethane produces no useless or excess gases, and no undesirable residues in the molding or other heating procedure. By reason of its inertness at room temperature with respect to the binding materials or materials adapted to form binding materials, it does not shorten the useful life of the composition in which it is incorporated and does not cause premature setting or hardening.

The invention is applicable to resinous binders and synthetic compositions, etc., such as synthetic resins of the phenol aldehyde type prepared by the condensation of a phenol with an aldehyde, resins of the urea aldehyde type prepared by condensation of a urea with an aldehyde, to natural resins such as substantially gasoline-insoluble pine wood resin and intermediate condensation products thereof with formaldehyde or hexamethylenetetramine, to resins of the foregoing types modified with other resins, with proteins, or with fatty oils or fatty acids, and especially to resins adapted to be converted by formaldehyde and heat to an infusible insoluble form, and to protein binders such as glue, gelatin, casein, blood albumen, corn protein, soyabean protein, etc. It is also applicable to mixtures of resinous materials with one another and with protein materials such as for example, a mixture of substantially gasoline-insoluble pine wood resin and phenolic resin, a mixture of a urea formaldehyde resin and a phenolic resin.

The present invention is applicable to the formation of a resinous condensation product having binding properties, by the reaction of trimethylolnitromethane under the action of heat with an organic material devoid of binding properties but capable of reaction with formaldehyde to yield a binder. For example, the trimethylolnitromethane may be reacted with phenols such as phenol, cresol, xylenol, etc., or with ureas such as urea or thiourea, etc., to form a phenol formaldehyde or urea formaldehyde type condensate having binding properties. Preferably, such a resin-forming reaction is carried out in the presence of a small amount of an alkali catalyst, say from about 0.1% to about 10%, and preferably about 1% of alkali hydroxides, alkaline earth hydroxides such as calcium hydroxide, ammonium hydroxide, alkali carbonates, alkali borates such as borax, alkali phosphates, such as trisodium phosphate, etc. based on the weight of phenol or urea.

The process of the present invention is preferably carried out in the presence of a small amount of an alkali of the type just enumerated in an amount from about 0.1% to about 10% by weight of the binding material to be hardened or the phenol or urea to be converted into a binding material or hardened.

The reaction is preferably effected by subjecting the binding material or the phenol or urea, in the presence of the trimethylolnitromethane to the action of heat sufficient to decompose the trimethylolnitromethane to formaldehyde and a plasticizing tar. Such heat also accelerates the reaction between the liberated formaldehyde and the material being acted upon and causes the plasticizing tar to exert a fluxing action upon the binding material present or formed. This heating may be brought about by the usual heat treatment applied in the conventional use of the composition, such as, for example, drying at an elevated temperature, baking, molding or forming under heat and pressure, etc. In this way, the use of a separate heating step is eliminated. The temperature employed may vary from about 150° F. to about 400° F. Preferably a temperature of at least about 300° F. is employed, although somewhat lower temperatures may cause a slower but in many cases satisfactory evolution of formaldehyde. Temperatures of as high as about 100° F. may be used in the formulation of the composition, or in its preliminary handling or treatment without causing undue decomposition of the trimethylolnitromethane.

Since trimethylolnitromethane is unstable in the presence of aqueous alkali, and gives off formaldehyde, the reaction may be effected in the cold by using a mix containing aqueous alkali.

The trimethylolnitromethane is incorporated in the material in any suitable amount as from about 1% to about 100%, and preferably from about 2% to about 25%, based on the weight of the binding material to be hardened, or based on the weight of the phenol or urea to be converted into a resinous binding agent. It may conveniently be dissolved in the resinous coating or impregnating composition such as a laminating varnish, or, in the case of a resinous molding powder, admixed therewith in advance of the molding operation as for example at the time of manufacture. The other ingredients commonly employed in the coating or plastic composition such as converting agents, alkalies, fillers, pigments, modifiers, conventional plasticizers, dyes, mold lubricants, etc., may be incorporated in the usual manner.

The invention is particularly applicable to the manufacture of laminating varnish for the impregnation of fibrous sheets followed by the pressing of a number of such sheets together under heat and pressure to form a laminated board. Preferably, such a laminating varnish is made with a phenol aldehyde type resin which is capable of being converted to the infusible state by formaldehyde or hexamethylenetetramine. Any type of fibrous material may be adhered or laminated by the process of the present invention, such as paper, wood veneer, cloth, asbestos sheets, etc. A particularly satisfactory laminating varnish may be made by admixing a solution containing about 30% of a cresol-formaldehyde resin and about 70% of a volatile organic solvent, with from about 5% to about 20% of trimethylolnitromethane by weight based on the weight of resin in the solution.

The invention has also been found to yield unusually satisfactory results when applied to molding powder made with phenolic resins such as resins made from phenol, resorcinol, beta naphthol, cresols or xylenols, reacted with any of the usual aldehydes such as formaldehyde, acetaldehyde, or furfural. Any of the usual alkali catalysts such as ammonia, lime, or soda ash may be used in the mixture as well as any of the usual converting agents, as for example, hexa or paraformaldehyde in addition to the trimethylolnitromethane. Trimethylolnitromethane may also advantageously be used in phenolic molding powders containing substantially gasoline-insoluble pine wood resin, such as are described in U. S. Patents Nos. 2,115,496 and 2,141,043. It is also applicable with substantially gasoline-insoluble pine wood resin and compositions made therewith. Thus, it may be used in place of hexamethylenetetramine in the preparation of a condensation product of such a resin with hexamethylenetetramine, as disclosed in the copending application of A. B. Miller, Serial No. 232,611, September 30, 1938.

Below are given several illustrative examples showing typical methods of carrying the present invention into practice.

Example 1

To 150 g. of a commercial laminating varnish containing 65% by weight of a cresol-formaldehyde resin and 35% by weight of an ethyl alcohol-toluene solvent, was added 4.9 g. of trimethylolnitromethane (approximately 5% on the weight of resin) and the resulting mixture was diluted to 30% solids by adding 17 g. of toluene and 157 g. of ethyl alcohol. Fifteen sheets of alpha cellulose pulp were impregnated with the varnish and were then dried for 10 minutes at 260° F. The resulting sheets were assembled and were pressed together for 20 minutes at 325° F. under a pressure of 1500 pounds per square inch. The resulting laminated board was superior to an identical board made without trimethylolnitromethane in flexural strength, modulus of elasticity, hardness, flexibility, and water adsorption.

Example 2

To 150 g. of the same commercial laminating varnish as was employed in Example 1, there was added 19.5 g. of trimethylolnitromethane (20% on weight of resin), 17 g. of toluene and 157 g. of alcohol. Fifteen sheets of 10 point alpha cellulose pulp were impregnated with the varnish, separately dried for 10 minutes at 260° F., assembled and pressed 20 minutes at 325° F. with a pressure of 1500 pounds per square inch. A very satisfactory laminated board resulted which exhibited an even higher flexibility than the board of Example 1.

Example 3

A molding powder was made by mixing 142.5 g. of a commercial molding type phenolic resin known in the trade as "Bakelite BR13761" which contained about 89.5% of a heat convertible phenolaldehyde type resin, about 7.5% of hexamethylenetetramine, and about 3% lime, with 7.5 g. of trimethylolnitromethane, 3 g. of magnesium stearate, and 150 g. of wood flour. The percentage of trimethylolnitromethane employed was 5.88 based on the weight of the resin present which was a phenol formaldehyde resin convertible to the infusible stage by reaction with formaldehyde or hexamethylenetetramine under heat. The foregoing materials were ball milled together for 2 hours, and then compounded on the roll mill at 250° F. for 1.5 minutes. The resulting sheet was granulated and molded into articles of the desired shape. This molding powder cured much faster, and yielded articles having much higher flexural strength, impact strength, and better electrical properties than articles molded from an identical powder from which the trimethylolnitromethane had been omitted.

Example 4

| | Parts by weight |
|---|---|
| Water | 2000 |
| Trimethylolnitromethane | 100 |
| Urea | 100 |
| Sodium hydroxide | 1 |
| Total | 2201 |

A silk back rayon pile transparent velvet was passed through the above solution at a temperature of 140° F., excess solution was removed by squeezing and the treated velvet was dried for 30 minutes in an oven at a temperature of 230° F. A soft crush-resistant finish with some body was imparted to the velvet, but its shade and transparency were not impaired.

Example 5

Powdered casein was mixed with boiling hot water to form a doughy mix which was chopped into coarse particles and allowed to dry. The dry material was then ground to about 20 mesh and mixed with trimethylolnitromethane and water to give a mass containing 75% casein, 5% trimethylolnitromethane, and 20% of water. The mixture was sealed for 24 hours and then compression molded under the usual heating and pressure in the disk mold. While it is usually necessary to harden casein plastics after molding by treating with formaldehyde solutions, it was found that by the use of the technique of this example, the subsequent hardening treatment could be eliminated because of the hardening effect of the formaldehyde liberated by the decomposition of the trimethylolnitromethane during the molding process. A further advantage was that the hardening accomplished by the present example was uniform throughout, whereas surface treatment of molded casein articles by aqueous formaldehyde converts only the surface of the plastic. Control of the speed and degree of hardening was readily obtainable by regulating the time and temperature of heating the plastic and the concentration of the trimethylolnitromethane.

Example 6

A casein water paint was prepared according to the following formula:

| | Parts by weight |
|---|---|
| Whiting | 55 |
| China clay | 15 |
| Lithopone | 10 |
| Dextrin | 2 |
| Casein | 12 |
| Lime | 5 |
| Trimethylolnitromethane | 3 |
| Trisodium phosphate | 1 |
| Water | 100 |

The casein and trisodium phosphate were soaked in ¼ of the water for one hour. The lime was mixed with enough water to form a putty. The lime mix and the casein mix were then combined whereupon the balance of the ingredients was stirred in. The trimethylolnitromethane reacted to form formaldehyde in the presence of the lime and the formaldehyde so liberated reacted with the casein. This resulted in an increased bodying of the paint and an improved hardness of the paint film after drying. Again, control of the hardening action could be accomplished by controlling the amount of trimethylolnitromethane employed and also by regulating the quantity of lime or other basic material present in the formulation.

Example 7

Twenty-five parts by weight of a solution of casein in ammonia containing 15% of casein by weight, 80% of water, and 5% of NH₄OH, were admixed with three parts by weight of trimethylolnitromethane. The resulting mixture was applied as a thin film to glass and also to paper. Upon drying, a very flexible protective film resulted. The paper so coated could be bent without breaking. This mixture was an excellent heat sealing adhesive for paper, wood, Cellophane, and the like.

Example 8

| | Percent by weight |
|---|---|
| 100 mesh casein | 79 |
| NH₃ | 1 |
| Water | 20 |

Disks were molded from this casein mix. Just before molding 5% of trimethylolnitromethane was added to some of the molding masses. To this 10% by weight of trimethylolnitromethane was added. The molding was under the usual heat and pressure. Soft, transparent, flexible rubbery disks were obtained which remained soft and flexible even after 5 hours drying in air at room temperature.

Disks made from the foregoing composition containing no trimethylolnitromethane were made and plunged into aqueous 40% formaldehyde. The resulting disks although pliable were not as soft and flexible as those made with trimethylolnitromethane.

A further advantage of the use of trimethylolnitromethane was noted in that after it was added to the mixes, the mix acted as if a large quantity of water had been added. The powder swelled and stuck together like dough indicating a considerable plasticizing action.

Example 9

One mol of trimethylolnitromethane was treated with three mols of phenol in ethyl alcohol solution for several hours at a temperature of about 80° C. after which the solvent was removed. The product so prepared was useful as a glue or binder. By subjecting it to further heating it was transformed into a hard, infusible, insoluble resin. By varying the ratio of trimethylolnitromethane to phenol, products of different degrees of hardness could be prepared. It was also possible to dispense with the use of a solvent and to carry out the reaction at higher temperatures or, through use of a suitable basic catalyst, to force the decomposition of the trimethylolnitromethane at lower temperatures, thus permitting reaction with phenol at lower temperatures. Furthermore, with low ratios of trimethylolnitromethane to phenol, an intermediate product could be obtained which was subsequently hardened by treatment with formaldehyde according to well known methods.

Example 10

| | Parts by weight |
|---|---|
| Phenolic resin BR13761 (same as in Example 3) | 75 |
| Powdered substantially gasoline insoluble pine wood resin | 75 |
| Trimethylolnitromethane | 16.5 |
| Trisodium phosphate | 3.8 |
| Wood flour | 150 |
| Carbon black | 3 |
| Magnesium stearate | 3 |

These ingredients were mixed together and then roll-milled for several minutes at 250° F. and molded in a disk mold under 2000 lbs. per square inch pressure at 325° C.

Example 11

A laminating varnish was prepared by dissolving 165 g. of substantially gasoline-insoluble pine wood resin in a blend of 121 g. of ethyl alcohol and 14 g. of toluene. Fifteen grams of trimethylolnitromethane and three grams of concentrated (28%) ammonium hydroxide were added to the mixture. Sheets of 10 point alpha cellulose pulp were dipped into this varnish and dried for 15 minutes at 260° F. Fifteen of the dried sheets were pressed 20 minutes at 300° F. under a pressure of 1500 lbs. per square inch to give a ⅛ inch board. A very satisfactory laminated board of good flexibility was obtained which showed greater hardness at elevated temperatures than a comparative board prepared with formaldehyde as a converting agent in place of trimethylolnitromethane.

From the foregoing, it will be seen that trimethylolnitromethane serves as a converting agent and source of active methylene groups for materials capable of reacting with formaldehyde to yield a binding material, a hardened binder or a synthetic composition capable of being molded or fabricated into useful objects of permanent shape. In addition, trimethylolnitromethane serves as a plasticizer. Thus, the difficulty of proper plasticization of laminated boards which are to serve as punching stock may be overcome. At the present time, materials such as stearic acid, castor oil and dibutyl phthalate are used to plasticize the boards. Although by such a method the resin can be softened sufficiently for punching, as the resin ages, the plasticizer is gradually lost and brittleness and weakness result. The plasticizing action of the residue of trimethylolnitromethane upon such resins is not fugitive. Moreover, the present invention aids in preventing the loss of the conventional plasticizers if they are employed. The plasticizing action of the residue of trimethylolnitromethane does not interfere with the rate of cure. The greater strength, increased hardness and improved impact resistance of resinous articles hardened with trimethylolnitromethane makes it a very desirable converting agent for use in the plastics art. Products containing trimethylolnitromethane may be employed as ply-wood adhesives, for paper impregnation, etc. for molding such as injection or compression molding, for casting, and generally where the improved properties referred to above are of importance.

The use of trimethylolnitromethane causes no change in the normal procedure employed for molding resinous or protein compositions and one skilled in the art will experience no difficulty in its employment. No alteration of temperature, time or formulation is required. The trimethylolnitromethane may be added to the plastic or other material to be reacted therewith at any time prior to conversion thereof to the insoluble, infusible state.

While the foregoing description refers particularly to trimethylolnitromethane, I may use in place thereof dimethylolnitroethane which is also unstable at elevated temperatures, decomposing to produce formaldehyde, especially in the presence of an alkali. This compound is more stable than trimethylolnitromethane and requires in general higher temperatures and more stringent conditions to cause release of formaldehyde. It will also release somewhat less formaldehyde per mol than may be obtained from trimethylolnitromethane. It may be substituted therefor in the foregoing description and in any of the foregoing examples with obvious minor modifications thereof such as increasing the proportion and raising the treating temperature. Its greater stability is of advantage in slowing down the rate of release of formaldehyde which would be of value for example in the injection molding of heat-reactive phenolic resins or of casein plastics where a too rapid release of formaldehyde would cause premature hardening of thermosetting phenolic resin molding powders or of casein molding powders causing difficulty in effecting injection and in obtaining a homogeneous molded article.

As used herein, the terms "binder," "binding material," "material having binding properties" and the like are intended to denote a material having binding properties, whether or not such a material is used for binding another material without such properties. Thus, the term is intended to cover for example, powdered phenolic or urea type resins or powdered protein plastics, and structural articles and films or coating layers made from such resins even though no filler or aggregate be present. The term is intended to include materials adapted to yield hardened protective coatings, and synthetic compositions capable of being molded or fabricated into useful articles of permanent form.

This application is a continuation in part of my prior and copending application, Serial No. 262,634 filed March 18, 1939.

It will be understood that the details and examples hereinbefore set forth are illustrative only and that the invention as broadly described and claimed is in no way limited thereby.

What I claim and desire to protect by Letters Patent is:

1. A method of hardening a composition of matter comprising an organic binding material which is capable of being hardened by formaldehyde which comprises incorporating trimethylolnitromethane in said composition in an amount ranging from about 2% to about 25% by weight based on the weight of said organic material, shaping said composition, and thereafter heating to bring about decomposition of trimethylolnitromethane in the composition to formaldehyde and a plasticizing tar and hardening of the organic binding material by reaction with the released formaldehyde.

2. An article of manufacture comprising fibrous material impregnated with the thermal reaction product formed in situ by the action of heat upon a resinous condensate, hardenable by formaldehyde, of a phenol and an aldehyde, and trimethylolnitromethane in an amount ranging from about 2% to about 25% by weight based on the weight of said resinous condensate, the heat applied in forming the thermal reaction product being sufficient to decompose trimethylolnitromethane to formaldehyde for reaction with the condensate and to a plasticizing tar distributed in the resulting reaction product.

3. An infusible insoluble product comprising the thermal reaction product of a resinous condensate, hardenable by formaldehyde, of a phenol and an aldehyde, and trimethylolnitromethane in an amount ranging from about 2% to about 25% by weight based on the weight of said resinous condensate, the heat applied in forming the thermal reaction product being sufficient to decompose trimethylolnitromethane to formaldehyde for reaction with the condensate and to a plasticizing tar distributed in the resulting reaction product.

4. An article of manufacture comprising a plurality of parallelly disposed fibrous sheets impregnated and bonded together into a unitary structure by means of the thermal reaction product of a resinous condensate, hardenable by formaldehyde, of a phenol and an aldehyde, and trimethylolnitromethane in an amount ranging from about 2% to about 25% by weight based on the weight of said resinous condensate, the heat applied in forming the thermal reaction product being sufficient to decompose trimethylolnitromethane to formaldehyde for reaction with the condensate and to a plasticizing tar distributed in the resulting reaction product.

5. A laminating varnish comprising a solution containing about 30% of a soluble cresol-formaldehyde resin hardenable by formaldehyde and about 70% of a volatile organic solvent therefor, and trimethylolnitromethane in an amount ranging from about 5% to about 20% by weight based on the weight of said resin, the said varnish being capable of being heated to bring about decomposition of the trimethylolnitromethane to form formaldehyde reactive to harden the resin and a plasticizing tar distributed in the resulting reacted material.

6. A laminating varnish comprising a resinous condensate, capable of hardening by reaction with formaldehyde while being heated, of a phenol and an aldehyde, a volatile organic solvent therefor and trimethylolnitromethane in an amount ranging from about 2% to about 25% by weight based on the weight of said resinous condensate, the said varnish being capable of being heated to bring about decomposition of the trimethylolnitromethane to form formaldehyde reactive to harden the resinous condensate and a plasticizing tar distributed in the resulting reacted material.

7. The process which comprises reacting a phenol which is reactive with formaldehyde to form a resin with trimethylolnitromethane, under heat sufficient to bring about decomposition of said compound to formaldehyde and a plasticizing tar and to bring about formation of a resinous reaction product which is capable of exerting binding properties by reaction of the formaldehyde and the phenol.

8. In a process for converting proteins which are reactive with formaldehyde to form hardened plastics and binders, the steps of incorporating trimethylolnitromethane in said reactive protein, decomposing the trimethylolnitromethane to form formaldehyde and a plasticizing tar, and permitting the formaldehyde released to combine with and harden the protein.

9. A composition of matter comprising casein and trimethylolnitromethane, said composition being capable of being heated to bring about decomposition of the trimethylolnitromethane to form formaldehyde reactive to harden the casein, and a plasticizing tar distributed in the resulting composition.

10. A composition comprising the thermal reaction product of trimethylolnitromethane and an organic binding material which is capable of being hardened by formaldehyde, the heat applied in forming the thermal reaction product being sufficient to decompose the trimethylolnitromethane to formaldehyde and a plasticizing tar and to bring about a hardening reaction between the organic binding material and the released formaldehyde.

11. A new article of manufacture comprising a thermal condensation product of a phenol which is reactive with formaldehyde to form a resin and trimethylolnitromethane under conditions such as to decompose said compound to formaldehyde and a plasticizing tar and to bring about reaction between phenol and the formaldehyde released to form a resinous condensate, said resinous condensate being capable of exerting binding properties.

12. A composition comprising a thermal reaction product of casein and trimethylolnitromethane, the heat applied in forming the thermal reaction product being sufficient to decompose the trimethylolnitromethane to formaldehyde and a plasticizing tar and to bring about a hardening reaction between the casein and the released formaldehyde.

WILLIAM W. TROWELL.

REFERENCES CITED

The following references are of record in the file of this patent:

UNITED STATES PATENTS

| Number | Name | Date |
| --- | --- | --- |
| 1,645,226 | Carter | Oct. 11, 1927 |
| 1,981,514 | Koebner | Nov. 20, 1934 |
| 2,180,543 | Osgood | Nov. 21, 1939 |
| 2,231,458 | Trowell | Mar. 18, 1939 |
| 2,314,308 | Ellis | Mar. 16, 1943 |

OTHER REFERENCES

Gorski-Berichte der deutschen Chemischeu Gesellschaft 67, pages 996–1000 (1934).

Brother et al. article on page 1236 Ind. & Eng. Chem., vol. 30, November 1938.

Certificate of Correction

Patent No. 2,426,128.　　　　　　　　　　　　　　　　　　August 19, 1947.

WILLIAM W. TROWELL

It is hereby certified that error appears in the printed specification of the above numbered patent requiring correction as follows: Column 9, line 36, claim 1, before the words "to bring" insert *the composition*; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.* action product of casein and trimethylolnitromethane, the heat applied in forming the thermal reaction product being sufficient to decompose the trimethylolnitromethane to formaldehyde and a plasticizing tar and to bring about a hardening reaction between the casein and the released formaldehyde.

WILLIAM W. TROWELL.

REFERENCES CITED

The following references are of record in the file of this patent:

UNITED STATES PATENTS

| Number | Name | Date |
|---|---|---|
| 1,645,226 | Carter | Oct. 11, 1927 |
| 1,981,514 | Koebner | Nov. 20, 1934 |
| 2,180,543 | Osgood | Nov. 21, 1939 |
| 2,231,458 | Trowell | Mar. 18, 1939 |
| 2,314,308 | Ellis | Mar. 16, 1943 |

OTHER REFERENCES

Gorski-Berichte der deutschen Chemischeu Gesellschaft 67, pages 996–1000 (1934).

Brother et al. article on page 1236 Ind. & Eng. Chem., vol. 30, November 1938.

Certificate of Correction

Patent No. 2,426,128.                    August 19, 1947.

WILLIAM W. TROWELL

It is hereby certified that error appears in the printed specification of the above numbered patent requiring correction as follows: Column 9, line 36, claim 1, before the words "to bring" insert *the composition*; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*